Jan. 19, 1960 J. D. ALBRIGHT 2,922,118

AUTOMATIC FREQUENCY STABILIZING SYSTEM

Filed April 10, 1957

INVENTOR.
JOHN D. ALBRIGHT
BY [signature]
R. I. Tomkins
ATTORNEYS

United States Patent Office 2,922,118
Patented Jan. 19, 1960

2,922,118

AUTOMATIC FREQUENCY STABILIZING SYSTEM

John D. Albright, Beltsville, Md., assignor, by mesne assignments, to the United States of America as represented by the Secretary of the Navy Application April 10, 1957, Serial No. 652,073

8 Claims. (Cl. 331—17)

The present invention relates to an automatic frequency stabilizing system and more particularly to a system for stabilizing the frequency of a voltage controlled oscillator.

It is well known in the art that the frequency of operation of certain types of oscillators, for example free running multivibrators, may be determined or adjusted by varying the voltage applied to some part of the oscillator circuit. Systems for selecting the repetition rate of multivibrators by adjusting the voltage applied to the control grids of the multivibrator tubes are shown, for example, by the patents granted to Slaymaker et al., 2,536,822, issued January 2, 1951, and Moore, 2,540,539 issued February 6, 1951.

The systems of the prior art are unsatisfactory in that they do not prevent oscillator frequency drift (from the selected value) due to temperature changes, variation in the magnitudes of the oscillator supply voltages, etc. The present invention overcomes this disadvantage by providing a system to apply to the oscillator circuit a control voltage having an amplitude proportional to the frequency of the oscillator output voltage to thus compensate for changes in the operating conditions of the oscillator.

It is an object of the present invention to provide a system for automatically stabilizing the frequency of operation of a voltage controlled oscillator.

It is a further and more specific object of the present invention to provide a system to apply to an oscillator of the character described a control voltage having an amplitude proportional to the frequency of the oscillator output voltage.

Other objects and many of the attendant advantages of this invention will be readily appreciated as the same becomes better understood by reference to the following detailed description when considered in connection with the accompanying drawings wherein.

Figures 1, 2, 3, 4:
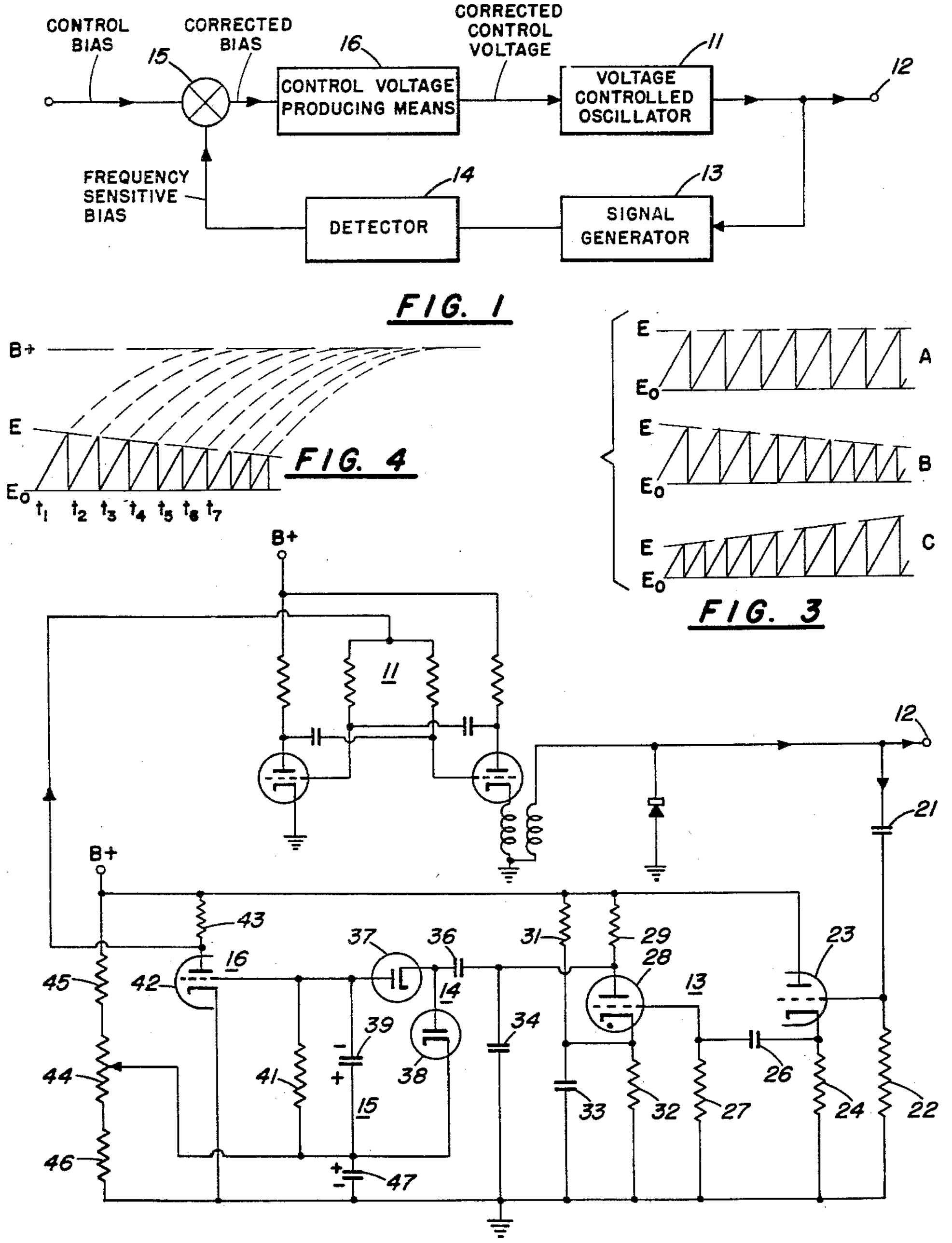
Fig. 1 is a block diagram of an embodiment of the invention.
Fig. 2 is a circuit diagram of a detailed embodiment of the invention.
Fig. 3 shows waveforms illustrating certain characteristics required of a signal generator to be employed in the invention.
Fig. 4 shows a waveform explanatory of the mode of operation of a suitable signal generator (shown in Fig. 2).

Referring now to Fig. 1, there is shown a voltage controlled oscillator 11 which may be a free-running multivibrator, as shown in the detailed embodiment of the invention illustrated in Fig. 2. It is characteristic of oscillators of this type that the frequency or repetition rate of the output voltage therefrom will vary directly with the magnitude of the positive bias voltage applied to the grids of the multivibrator tubes. While a multivibrator has been chosen for example, it is to be understood that the invention is applicable to any oscillator circuit in which the frequency of the output voltage bears some definite relationship to the magnitude of a suitable control voltage applied to some portion of the oscillator circuit. This relationship of course may be direct or inverse.

The output pulses from oscillator 11 are coupled to an output terminal 12 and to the input circuit of a signal generator 13.

Signal generator 13 may be any suitable means which upon application thereto of trigger pulses from oscillator 11, can generate a ramp function that is reasonably linear with respect to time. The relation between the frequency of oscillator 11 and the ramp function may be inverse or direct. For illustrative purposes, signal generator 13 has been shown in Fig. 2 as a thyratron sawtooth generator which provides an output voltage having an amplitude that is inversely proportional to the pulse repetition rate of oscillator 11. The waveforms of Fig. 3 show the configuration of the output from sawtooth generator 13 for:

A. Constant oscillator frequency
B. Increasing oscillator frequency
C. Decreasing oscillator frequency The output signals from signal generator 13 are coupled to a detector 14 which provides a negative D.C. output voltage having an amplitude which varies inversely with the pulse repetition rate of oscillator 11. The D.C. output voltage from detector 14 is compared with a reference voltage in a comparison circuit 15 and the differential voltage therefrom is applied to a control voltage producing means 16. Control voltage producing means 16 provides a positive D.C. control voltage for oscillator 11 having an amplitude which varies in magnitude inversely with the pulse repetition rate of the oscillator. Thus it may be seen that if the pulse repetition rate of oscillator 11 tends to increase, a control voltage will be generated and applied to oscillator 11 which will tend to decrease the pulse repetition rate thereof; whereas, if the pulse repetition rate of oscillator 11 tends to decrease, a control voltage will be applied thereto which will tend to increase the pulse repetition rate thereof.

Referring now to Fig. 2 which illustrates a detailed embodiment of the invention there is shown a multivibrator 11 of the character described which provides a pulse output to load terminal 12. The output from multivibrator 11 is further coupled by a capacitor 21 and a resistor 22 to the grid of a cathode follower isolation circuit comprising a tube 23 and a cathode resistor 24.

The output of the cathode follower circuit, taken from resistor 24, is coupled by capacitor 26 and resistor 27 to the grid of a thyratron 28 of sawtooth generator 13. Thyratron 28 is provided with an anode resistor 29. Resistors 31, 32 serve as a voltage divider between B+ and ground to provide the correct level of positive bias for the cathode of thyratron 28. A bypass capacitor 33 is provided for resistor 32. Capacitor 34, connected between the anode of thyratron 28 and ground, completes the sawtooth generator.

While the mode of operation of sawtooth generators of the type described above is generally well known, the following brief description may be of aid in understanding the invention.

Referring now to Fig. 4, it may be seen that at time $t_1$ (thyratron 28 is non-conducting) capacitor 34 begins to charge through resistor 29 toward the B+ value. At time $t_2$ a trigger pulse is received from oscillator 11 to ignite thyratron 28. Capacitor 34 discharges through thyratron 28 and resistor 32 almost instantaneously to the de-ionization potential of thyratron 28 (nearly zero) and immediately begins to recharge. The above described sequence is repeated at times $t_3$, $t_4$, $t_5$, $t_6$, $t_7$, etc. By adjustment of the circuit parameters, the slope of the sawtooth waveform may be made linear over the expected range of trigger pulse repetition rates. If $f$ is the trigger frequency, S is the slope of the sawtooth waveform, and the time delay between trigger pulses is:

$$t=\frac{1}{f} \tag{1}$$

then, as the slope S is constant, the amplitude of the envelope of the sawtooth output is given by:

$$E=St \tag{2}$$

or $$E=S\left(\frac{1}{f}\right) \tag{3}$$

In the example given, the pulse repetition rate of multivibrator 11 is increasing. It may be seen from Fig. 4 that the envelope of the sawtooth waveform appearing across capacitor 34 is linearly decreasing and is therefore inversely related to the pulse repetition rate of multivibrator 11 as stated above and indicated by Equation 3. While a thyratron sawtooth generator has been described for illustration, it is to be understood that other suitable signal generators may be employed if desired.

The voltage appearing across capacitor 34 is coupled through a capacitor 36 to a voltage doubling rectifier comprising diodes 37, 38, which develops a negative D.C. voltage across a storage capacitor 39 that is proportional in magnitude to the envelope of the sawtooth output from signal generator 13 and which varies inversely with the frequency of oscillator 11. Diodes 37, 38 comprise the detector 14 of Fig. 1. Capacitor 39 is provided with a discharge resistor 41. The voltage on capacitor 39 is applied as a negative D.C. bias voltage to the grid of tube 42 which has its plate connected through a plate resistor 43 to B+ and has its cathode grounded. Tube 42 and its associated circuitry comprise the control voltage producing means 16 of Fig. 2. The plate voltage of tube 42 is applied to oscillator 11 as the frequency control voltage.

As the expected range of variation of the oscillator frequency (and thus the sawtooth amplitude) will in general be a fairly small percentage of some nominal value, the D.C. bias voltage on the grid of tube 42 would be a fixed level with only a small variational component (error signal). It is therefore desirable to eliminate as much as possible of the fixed component of the D.C. bias thereby allowing the plate voltage of tube 42 to have as large a range of variation as possible. Because the control bias on tube 42 is negative, the fixed component can be blocked out with a positive voltage. This voltage (corresponding to the control bias shown in Fig. 1) is taken from a potentiometer 44, connected in series with resistors 45, 46 between B+ and ground, and applied across a capacitor 47. The connection of capacitors 39, 47 comprises the comparsion circuit 15 of Fig. 1.

If the oscillator frequency is increasing the bias voltage on the grid of tube 42 tends to decrease; the anode voltage thereof likewise tends to decrease; and a positive bias of decreasing magnitude is applied to multivibrator 11 to decrease the repetition rate of the pulse output therefrom. If the pulse repetition rate from multivibrator 11 has been decreasing, the regulating circuit would operate in like manner to apply a positive voltage to multivibrator 11 of increasing magnitude to thereby cause the pulse output repetition rate therefrom to increase.

The response of the system depends upon the time constant determined by the magnitudes of capacitor 39 and resistor 41. This time constant depending upon the application to which the invention is put may vary from several seconds to several minutes and is limited by how much ripple may be tolerated on the plate of tube 42.

Illustrative values of the components of the circuit shown in Fig. 2 are given below but are by no means to be construed as limiting the form which the invention may take.

| | |
|---|---|
| $C_{21}$=.01 $\mu$f. | $R_{27}$=7.5K |
| $C_{26}$=.1 $\mu$f. | $R_{29}$=390K |
| $C_{33}$=1.0 $\mu$f. | $R_{31}$=47K |
| $C_{34}$=.01 $\mu$f. | $R_{32}$=1.8K |
| $C_{36}$=.1 $\mu$f. | $R_{41}$=5M |
| $C_{39}$=2 $\mu$f. | $R_{43}$=100K |
| $P_{44}$=25K | $R_{45}$=240K |
| $R_{22}$=100K | $R_{46}$=25K |
| $R_{24}$=100K | |

Tubes 23, 42 may be both halves of a 12AX7, thyratron 28 may be type 6D4, and diodes 37, 38 may be of any appropriate type, single or double. The values of multivibrator 11 are not given since this circuit forms no part of the invention and is conventional in every respect.

Obviously many modifications and variations of the present invention are possible in the light of the above teachings. It is therefore to be understood that within the scope of the appended claims the invention may be practiced otherwise than as specifically described.

What is claimed is:

1. The combination comprising an oscillator of the type wherein the output frequency may be controlled by the application thereto of a direct current bias voltage: means connected to the output of said oscillator for generating a sawtooth voltage that varies in amplitude inversely with the frequency of the oscillator output voltage, detector means coupled to said sawtooth voltage generating means to provide a direct current output voltage proportional in magnitude to said sawtooth voltage, and means to apply said detector output voltage as a bias to said oscillator to thereby control the frequency of operation of said oscillator.

2. The combination of claim 1 wherein there is further provided means to generate a fixed bias voltage, and means to apply said fixed bias voltage to said oscillator in opposition to said detector output voltage.

3. The combination comprising an oscillator of the type wherein the frequency of the output voltage varies directly with the magnitude of a direct bias voltage applied to the oscillator circuit: means coupled to the output circuit of said oscillator to generate a sawtooth waveform that varies in amplitude inversely with the frequency of the oscillator output voltage, detector means coupled to said sawtooth generator to provide a direct output voltage proportional to the magnitude of said sawtooth waveform, charge storage means connected to said detector means to be energized thereby, means connected to said charge storage means to apply a bias voltage to said oscillator circuit proportional to the charge on said charge storage means.

4. The combination of claim 3 wherein there is further provided means to generate a fixed bias, and means to apply said fixed bias to said oscillator in opposition to said variable bias.

5. The combination of claim 3 wherein said detecting means comprises a voltage doubling rectifier and said charge storage means comprises a capacitor connected across the output circuit of said rectifier.

6. The combination of claim 5 wherein said bias voltage coupling means comprises a three element discharge device, circuit means connecting one terminal of said capacitor to a control element of said discharge device, and circuit means for coupling an electron collector element of said discharge device to said oscillator circuit.

7. The combination of claim 6 wherein there is further provided a second capacitor, circuit means connecting one terminal of said second capacitor to another terminal of said first mentioned capacitor, circuit means connecting another terminal of said second capacitor to an electron emitter element of said discharge device, and means to apply a voltage to said second capacitor opposite in polarity to the voltage applied to said first mentioned capacitor.

8. The combination of claim 7 wherein said sawtooth generator comprises a thyratron relaxation oscillator having the grid of said thyratron connected to the output circuit of said oscillator through an isolation circuit and circuit means connecting the anode of said thyratron to the input circuit of said voltage doubling rectifier.

References Cited in the file of this patent

UNITED STATES PATENTS

| | | |
|---|---|---|
| 2,503,700 | Barco | Apr. 11, 1950 |
| 2,526,353 | Harralson | Oct. 17, 1950 |
| 2,686,877 | Lawson | Aug. 17, 1954 |
| 2,722,607 | Rubin | Nov. 1, 1955 |
| 2,764,681 | Howell | Sept. 25, 1956 |
| 2,824,229 | Gratian | Feb. 18, 1958 |
| 2,848,610 | Freiemuth | Aug. 19, 1958 |